United States Patent Office.

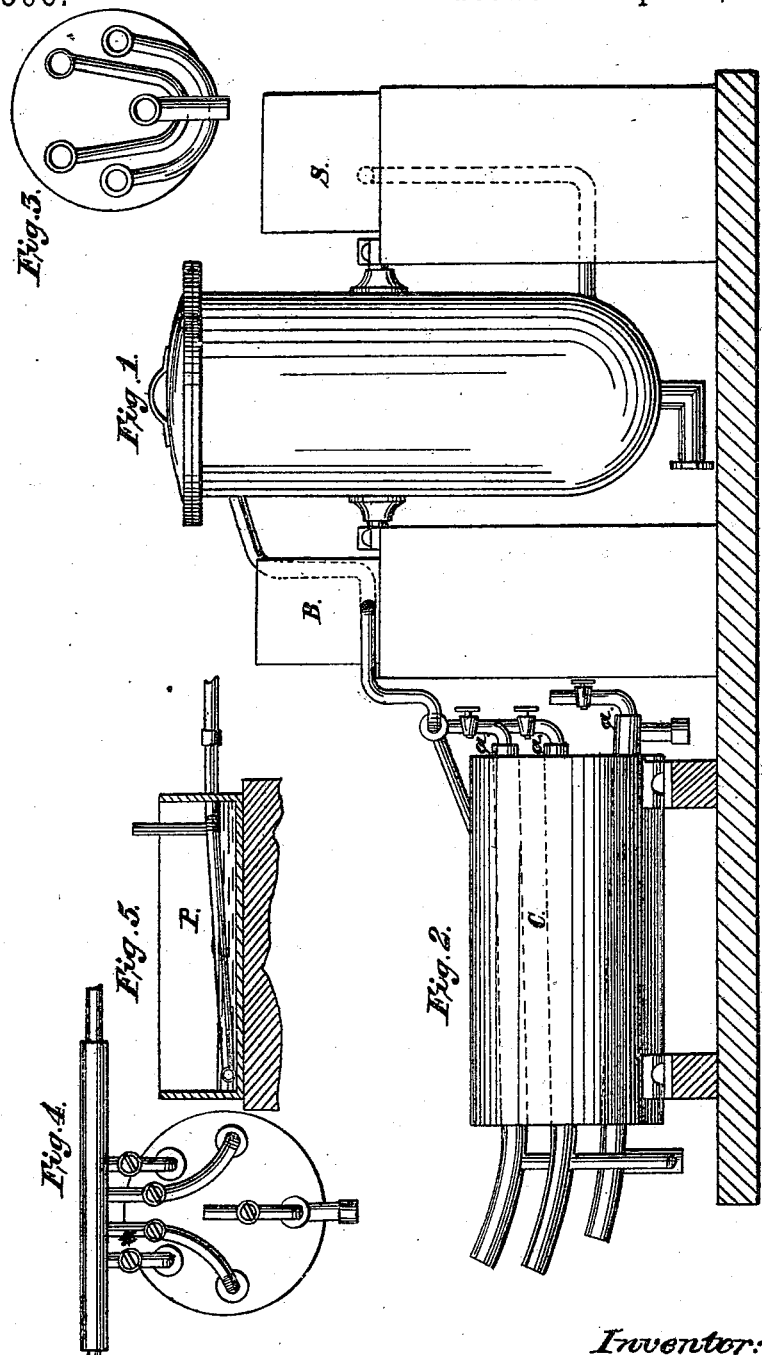

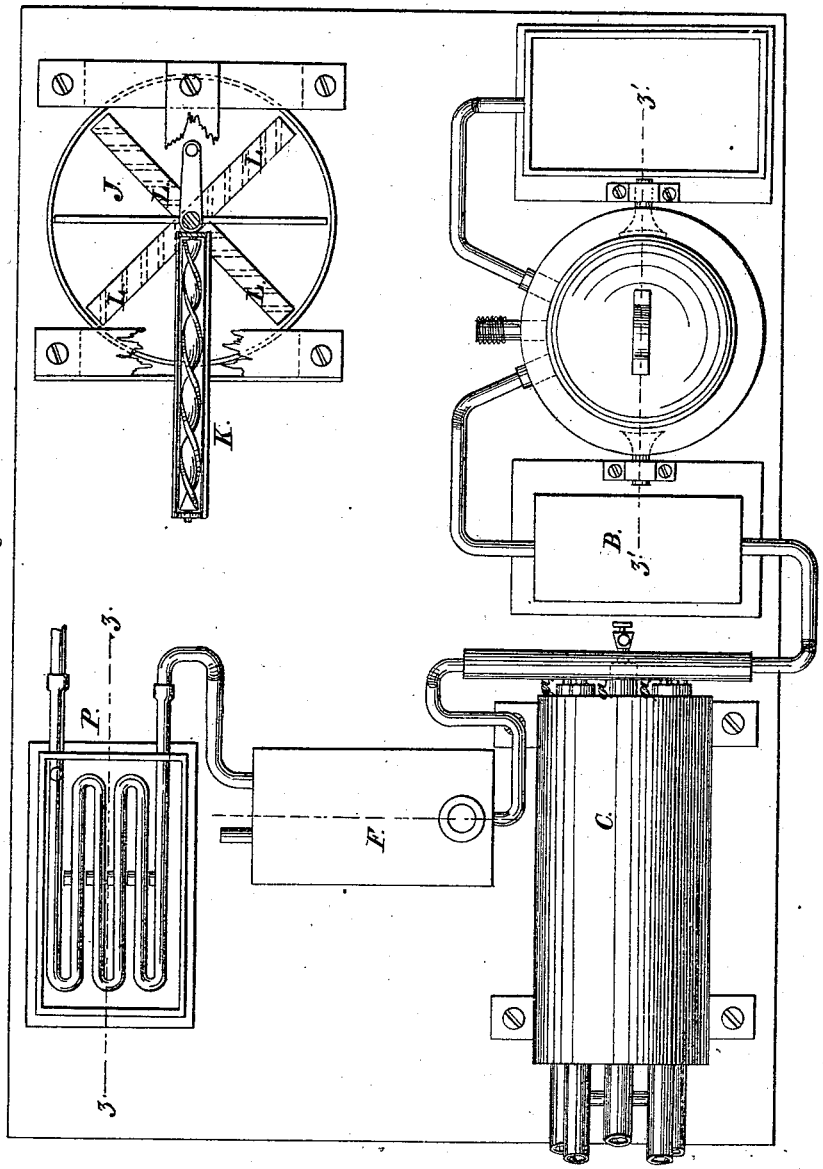

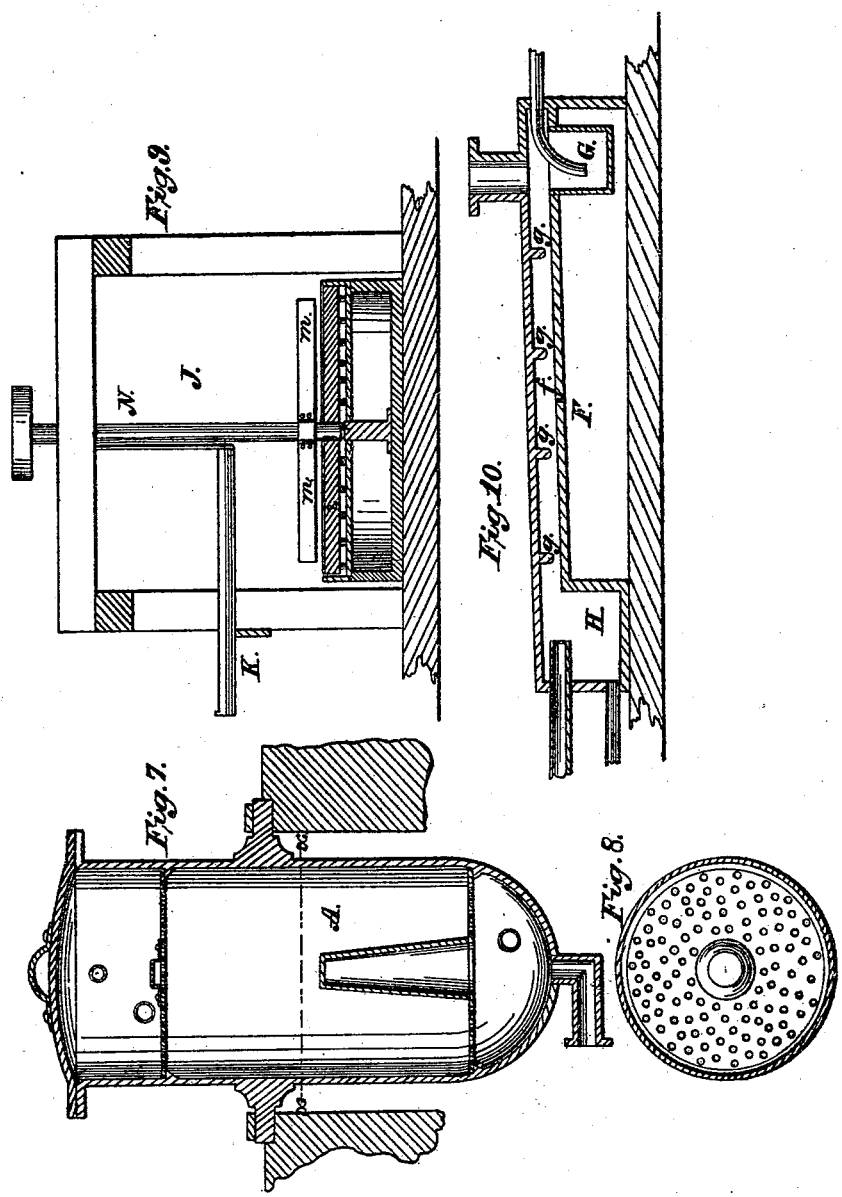

CARL OTTO HEYL, OF BERLIN, PRUSSIA, ASSIGNOR TO RUDOLPH SIEG, OF NEW YORK, N. Y.

*Letters Patent No. 68,506, dated September 3, 1867.*

---

IMPROVED APPARATUS FOR EXTRACTING OIL FROM ANIMAL AND VEGETABLE SUBSTANCES.

---

The Schedule referred to in these Letters Patent and making part of the same.

---

TO ALL WHOM IT MAY CONCERN:

Be it known that I, CARL OTTO HEYL, of Berlin, Prussia, have invented a new and useful Improvement in Extracting and Purifying Oil; and I do hereby declare that the following is a full, clear, and exact description thereof, which will enable others skilled in the art to make and use the same, reference being had to the accompanying drawings, forming part of this specification.

The object of this invention is to extract and purify oil from all oleaginous seeds, principally by the instrumentality of a chemical agent, and the invention consists in subjecting the crushed oleaginous seed to the action of sulphuret of carbon, when the seed is placed in a vase or a series of vases and in passing the products or oil through a distilling apparatus, and from thence through a purifier, and then to a refrigerator or condenser, and also in purifying the residuum from the sulphuret of carbon, and thus rendering it suitable food for cattle, as will be hereinafter more fully described.

Figure 1 (sheet 1) represents an elevation of one of the vases, a series of which can or may be used in the practical operation of my process.

Figure 2 represents a side view of the distilling apparatus.

Figure 3 represents a view of one end of fig. 2, showing the manner in which the pipes are connected or their location.

Figure 4 is a view of the other end of the distilling apparatus.

Figure 5 is a vertical longitudinal section of the condenser.

Figure 6 (sheet 2) represents a plan or top view of the whole apparatus.

Figure 7 (sheet 3) represents a vertical section of the vase through the line $y\,y$ of fig. 6, and the desiccating arrangement, Figure 9, and also a cross-section of the vase through the line $x\,x$.

Similar letters of reference indicate like parts.

The vase (best seen in fig. 7, sheet 3) has a perforated bottom, with a conical attachment in its centre, as seen in the drawing. Above the bottom or near the top of the vase is a perforated partition. Both of these perforated plates rest on shoulders in the vase. In the space between these plates is placed the crushed oleaginous seed from which the oil is to be extracted. A is the chamber in which the seed is placed. B is a vessel which contains sulphuret of carbon. It stands in an elevated position, so that when the seed has been placed in chamber A in the vase a jet of the sulphuret of carbon is let in among it. This disengages the oil, which passes into the distilling apparatus, where it is evaporated by the heat of steam. The distilling vessel is marked C, and the pipes connected with it are represented by $a$. It is not considered necessary to go into all the details of the arrangement. As before stated, the invention mainly consists in extracting the oil from the seed by the agency of the sulphuret of carbon and purifying the oil, and freeing the residuum from the chemicals used. From the distilling vessel and pipes the oil passes into the purifying vessel marked F, Figure 10. G is a basin in this vessel, into which the product of the distilling vessel is discharged. It passes from the basin G through the space marked $f$, where its course is retarded by the ledges or projections marked $g$, when it descends into another basin marked H. In passing through the distilling apparatus, as well as through the purifier F, the oleaginous current is subjected to contact with jets of steam, by which the oil is nearly freed from the sulphuret of carbon. From this vessel it passes to the condenser seen in fig. 6, sheet 3. The oil thus obtained is treated with chloride of zinc in the form of fine powder, for the purpose of bleaching it or freeing it of its yellow color. The desiccating apparatus is seen on sheets 2 and 3, at J. The residuum is conveyed to it by the revolving-screw conveyer marked K, where it is agitated on a platform by revolving arms, which have teeth or buckets on their under side. These arms are rotated by a vertical revolving shaft. The arms are marked L. The upright shaft has other arms or wings, which are placed above L, which serve as blowers. These wings are marked $m$. The shaft is marked N. The residuum is afterwards ground fine, and properly prepared for food for cattle. P represents the condenser. Fig. 5 is a section of it through the line $z\,z$, and the vertical section of the vase A, fig. 7, is through the line $z'\,z'$, fig. 6, sheet 2. S is a reservoir.

I do not confine myself to any particular arrangement as regards the details of my apparatus. I am aware that they may be varied in different ways and the same result be produced, and I do not therefore claim the separate parts as being the substance or important features of my invention, but—

Having thus described my invention, what I claim as new, and desire to secure by Letters Patent, is—

1. The construction and arrangement of the bases A, sulphuret-of-carbon vessel B, distilling vessel C, connecting pipes a, purifying vessel F, basins G and H, connected by space $f$, desiccating apparatus J, condenser P, and reservoir S, as herein set forth for the purpose specified.

2. The construction and arrangement of the desiccating apparatus J, provided with screw conveyer K, revolving vertical shaft N, having arm L provided with teeth or buckets, and blowers $m$, as herein shown and described for the purpose specified.

3. The construction of the suspended vase, provided with a removable perforated bottom having central conical projection, and a removable perforated partition near the top, whereby the seed-chamber A is formed, as herein shown and described, for the purpose specified.

4. The combination of the basins G H, when connected together by the space $f$, having the downward projections $g$, as herein set forth for the purpose specified.

CARL OTTO HEYL.

Witnesses:
   FERDINAND KRAAZ,
   CARL KALBERSBERG.